July 19, 1966  C. W. STEWART  3,261,206
DOUBLE ADJUSTMENT CRANK ASSEMBLY FOR DIAPHRAGM TYPE GAS METERS
Filed June 23, 1964  2 Sheets-Sheet 1
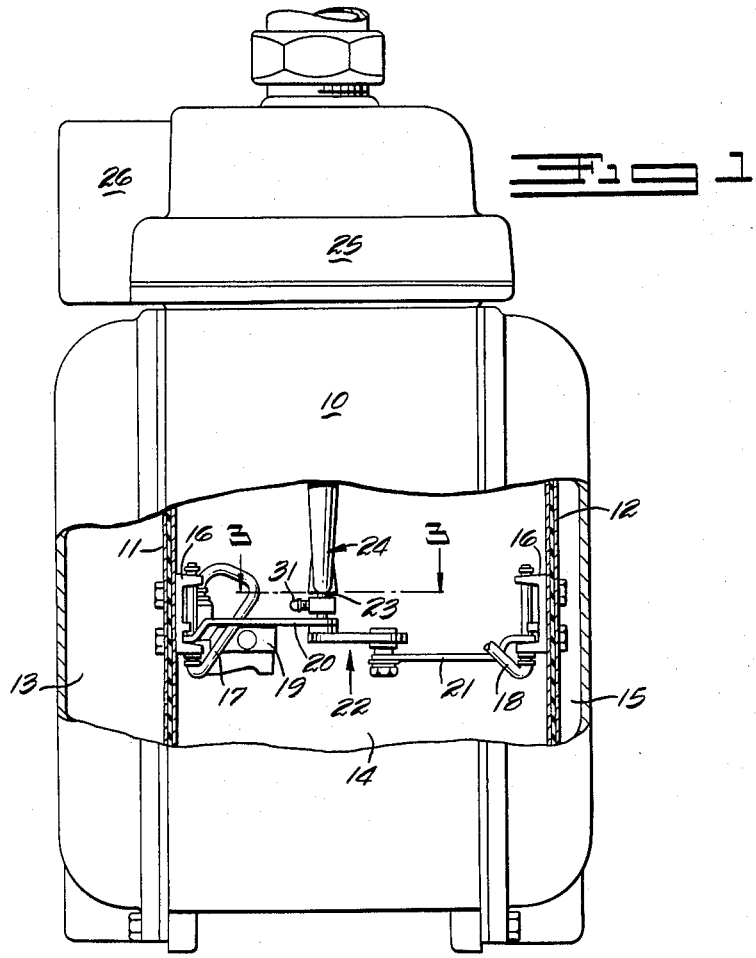
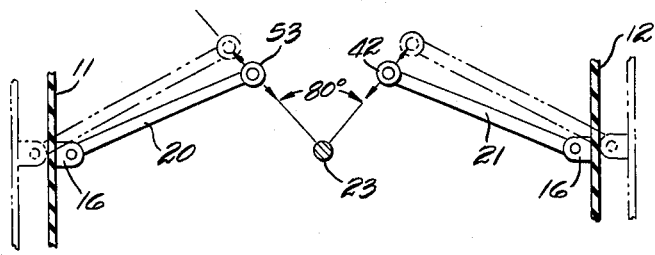
INVENTOR.
CHARLES W. STEWART
BY
MAHONEY, MILLER & RAMBO
BY
ATTORNEYS

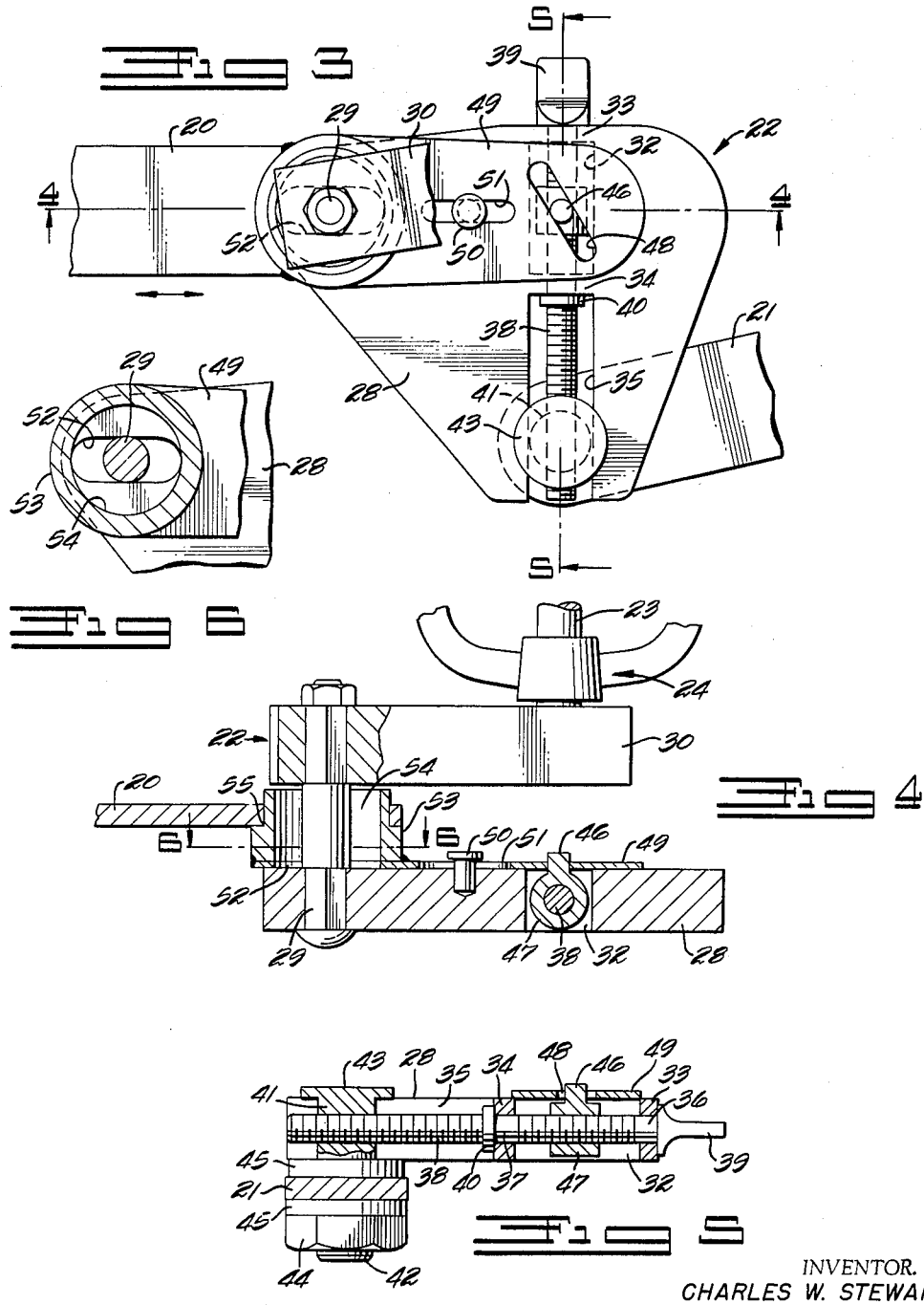

United States Patent Office 3,261,206
Patented July 19, 1966

3,261,206
DOUBLE ADJUSTMENT CRANK ASSEMBLY
FOR DIAPHRAGM TYPE GAS METERS
Charles W. Stewart, Lancaster, Ohio, assignor to
Karl L. Schaus, Tempe, Ariz.
Filed June 23, 1964, Ser. No. 377,185
3 Claims. (Cl. 73—281)

This invention relates generally to diaphragm-type gas meters and more specifically to an improved mechanism for simultaneously adjusting the operating strokes of a pair of cooperative diaphragms which are connected through a common motion-transmitting crank linkage with the valving and recording mechanisms of the gas meter.

In the past, it has been common practice to employ a manually adjustable screw mechanism associated with the internal crank linkage of a three chamber, two diaphragm-type gas meter for the purpose of adjusting the operating stroke of one of the diaphragms and thereby regulate the volume of gas displaced from the chambers in which the one diaphragm operates. However, adjusting the stroke of only one of the two diaphragms creates an imbalance in the originally designed displacement between the three chambers of the meter with attendant imbalanced pressure differentials which result in higher delivery pressure pulsations and premature bearing wear, all of which adversely affects the accuracy of the meter. Additionally, adjustment of the stroke of only one of the diaphragms ordinarily throws the valve mechanism of the meter out of synchronization and necessitates a trial and error adjustment of the usual valve timing mechanism of the gas meter, with the result that the "proofing" of the meter becomes extremely laborious and costly.

While certain prior art mechanisms have been proposed for simultaneously adjusting the operating strokes of both diaphragms of a three chamber gas meter, such mechanisms have been relatively complicated, cumbersome and inefficient for their intended usage, with the result that they have never been adopted for commercial use. Examples of such prior, double-adjusting mechanisms are shown and described in U.S. Patents No. 2,296,476 issued September 22, 1942 to A. S. McIntire, No. 2,296,477 issued September 22, 1942 to A. S. McIntire and No. 2,296,485 issued September 22, 1942, to F. Whitworth. By and large, the so-called double diaphragm-adjusting mechanisms proposed in these prior art patents are objectionable due to the structural complexity of the adjusting mechanism, the increased weight imposed upon the drive shaft of the meter and the relatively high costs of manufacture and installation of such adjusting mechanism.

Accordingly, it is the primary object of this invention to generally improve upon the so-called, double diaphragm-adjusting mechanisms disclosed in the aforementioned prior art patents by which the operating strokes of both diaphragms of a three chamber gas meter may be simultaneously varied and adjusted proportionately to one another whereby to compensate for inaccuracies of the meter occasioned by faulty construction or wear.

It is another object of this invention to provide a mechanism for simultaneously adjusting both diaphragms of a three chamber gas meter, which mechanism utilizes substantially all of the structural elements making up the usual and standard screw-type single diaphragm-adjusting mechanism associated with the lower crank assembly of the gas meter, with the addition of a relatively simple, lightweight linkage arm or sliding strip connected with the pivot bearing for the pitman link of the second diaphragm and with a traveling cam carried by the usual single adjusting screw for the other diaphragm, whereby the operating strokes of both diaphragms may be varied simultaneously upon adjustment of the usual single adjusting screw of the diaphragm-actuated lower crank assembly of the meter.

These and additional objects and advantages of the present invention will become more readily apparent by reference to the following description and the accompanying drawings, wherein:

FIG. 1 is a side elevational view, partially in vertical section, of a two diaphragm, three chamber gas meter of the type to which the double diaphragm adjusting mechanism of the present invention is applicable;

FIG. 2 is a diagrammatic top plan view showing the pattern of adjustment of the diaphragm pitman link relative to the main drive shaft of the meter;

FIG. 3 is an enlarged horizontal sectional view taken along the line 3—3 of FIG. 1 and showing the present double diaphragm adjusting mechanism;

FIG. 4 is a vertical sectional view taken along the line 4—4 of FIG. 3;

FIG. 5 is a vertical sectional view taken along the line 5—5 of FIG. 3; and

FIG. 6 is a detailed horizontal sectional view taken along the line 6—6 of FIG. 4.

Referring now to the drawings, FIG. 1 illustrates a typical three chamber, two diaphragm, Sprague-type gas meter in which the present, improved crank mechanism is incorporated. The meter, as shown, includes a main casing 10 in which is mounted a pair of opposed, reciprocatory diaphragms 11 and 12. The diaphragms 11 and 12 divide the casing 10 internally into three separate measuring chambers, 13, 14 and 15. Rigidly connected with the central portion of each of the diaphragms 11 and 12 is the usual hinge bracket 16. The hinge bracket 16 and the central, flexing portion of each diaphragm are supported and guided for back-and-forth reciprocation by the usual bent carrier wires 17 and 18 which, in turn, are pivotally or hingedly connected with stationary mounting brackets 19 secured to the inner side walls of the casing 10. Pivotally connected with the hinge brackets 16 are the outer end portions of a pair of diaphragm-actuated pitman links 20 and 21. The inner end portions of the pitman links 20 and 21 are pivotally connected with the present improved crank assembly, which is designated generally by the reference numeral 22 in FIG. 1, and which will be hereinafter described in detail. The crank assembly 22 is supported upon and is drivingly connected with the lower end of the main drive shaft 23 of the meter. In the usual manner, the drive shaft 23 extends vertically upwardly through the center chamber 14 of the meter and is journaled for axial rotation in a stationary bearing bracket 24 which depends from and is rigidly supported by the interior framework of the meter, not shown.

As will be readily understood by those skilled in the art, the upper end portion of the drive shaft 23 is connected to drive a gyrating or orbiting valve member, not shown, which is conventionally mounted within the usual distributing chamber defined by a valve casing 25. The valving mechanism, not shown, functions to control the flow of gas to and from the measuring chambers 13, 14, and 15 and the movement of the orbiting valve member is suitably translated by an index drive mechanism, also not shown, to drive the flow-indicating and recording mechanism of the meter which is contained in the register housing or casing 26.

With the exception of the present improved diaphragm-actuated crank assembly 22, the parts of the gas meter, as heretofore described, are conventional, and as such, form no part of the present invention.

In accordance with the present invention, the crank assembly 22 provides a means by which the operating strokes of the diaphragms 11 and 12 may be simultaneously, proportionately adjusted to obtain accurate total displacement of gas to and from the measuring chambers 13, 14 and 15 of the meter. Toward this end, the crank assembly 22 comprises a crank plate 28 which is of generally triangular shape and which is supported in a generally horizontal plane for rotation about a vertical axis coincident to the axis of rotation of the main drive shaft 23. The crank plate 28 is non-rotatively connected with and supported by the lower end portion of a crank pin 29 which, in turn, is non-rotatively connected with and supported in depending relation to a crank arm 30 drivingly connected with the lower end of the drive shaft 23. In the usual manner, the crank arm 30 may be provided with an adjustment screw mechanism, indicated generally by the reference numeral 31 in FIG. 1, by means of which the crank arm 30 may be rotationally adjusted and indexed on the drive shaft 23.

The crank pin 29 serves to connect the crank plate 28 for rotation as a unit with the crank arm 30, while at the same time, maintaining the plate 28 in vertically spaced, parallel relation to the crank arm 30. The crank plate 28 is formed in the area of its axis of rotation with a first, vertically opening, rectangular slot 32 whose long axis extends radially of the axis of rotation of the crank plate 28. The slot 32 is bounded at one end by an edge wall 33 of the plate and at its opposite end by a divider web or wall 34. A second, elongated, rectangular slot 35 is formed in the crank plate 28 in longitudinal alignment with the first slot 32, but is separated from the first slot 32 by the divider wall 34. The walls 33 and 34 of the crank plate 28 are formed with axially aligned bearing openings which rotatively receive the unthreaded cylindrical journals 36 and 37 of an otherwise threaded adjusting screw 38. The adjusting screw 38 extends longitudinally and axially through both of the slots 32 and 35 and is arranged in perpendicular, radial relation to the axis of rotation of the crank plate 28. The screw 38 terminates at one end in a flattened actuating knob or handle 39 by which the screw may be manually rotated. The screw 38 is held against axial bodily movement by means of a stop collar 40 carried on the screw in abutting relation to the divider wall 34.

Threadedly engaged with the outer end portion of the adjusting screw 38 is the vertically extending shank portion 41 of a bearing post 42. As will be noted in FIGS. 3 and 5, the diameter of the cylindrical shank portion 41 of the bearing post 42 closely approximates the width of the slot 35, whereby to provide for longitudinal sliding movement of the bearing post 42 within the slot 35 upon axial rotation of the screw 38. The upper end of the post 42 is formed with a relatively enlarged and flattened bead 43 which overlies the upper surfaces of the crank plate 28 on either side of the slot 35 and supports the post for sliding movement within the slot. The lower end portion of the bearing post 42 projects below the crank plate 28 and pivotally receives the apertured inner end portion of the pitman link 21. A retaining nut 44 is threaded onto the lower end of the post 42, and a pair of spacer washers 45 are carried on the lower end portion of the post 42 on opposite sides of the pitman link 21 to prevent binding of the link on the post.

Slidably carried within the inner slot 32 of the crank plate 28 and threadedly engaged with the screw 38 is a traveling cam stud 46. The cam stud 46 is formed with a cylindrical collar portion 47 having a screw-threaded bore which engages the threaded portion of the screw 38 in a manner to cause the cam stud to move longitudinally of the screw 38 in unison with the bearing post 42 upon axial rotation of the screw. The cam stud 46 projects upwardly above the upper surface of the crank plate 28 and through a diagonal cam follower slot 48 formed toward the inner end of a relatively thin, strip-like link or arm 49. The arm 49 is mounted for limited sliding movement on the upper surface of the crank plate 28 by means of a headed guide pin 50 carried by the crank plate and extending upwardly through an elongated guide slot 51 formed longitudinally in the intermediate portion of the arm 49. Additionally, the outer end portion of the arm 49 is formed with an elongated, longitudinally disposed guide slot 52 which slidably embraces the crank pin 29. The longitudinal axis of the arm 49 is disposed in radially intersecting relation to the axis of rotation of the crank plate 28 and in approximately 80° angular relation to the axis of the screw 38, and due to the close engagement of the cam stud 46 with the walls of the cam follower slot 48, the arm 49 is caused to slide radially inwardly and outwardly with respect to the axis of rotation of the crank plate 28 upon rotation of the adjusting screw in opposite directions.

Rigidly secured to the outer end of the link or arm 49, as by welding or brazing, is an annular bearing port or collar 53. The bearing collar 53 extends upwardly from the arm 49 in the space between the crank plate 28 and the crank arm 30, and is formed with an enlarged axial bore 54 having a diameter approximately equal to the length of the slot 52 formed in the arm 49. Thus, the bearing collar 53 loosely surrounds the crank pin 29, so as to permit the collar to move with the arm 49 radially inwardly and outwardly with respect to the axis of rotation of the crank plate 28. Additionally, the bearing collar 53 is formed on its outer periphery with a stepped shoulder portion 55 and the inner, apertured end of the opposite pitman link 20 is pivotally engaged with the collar 53 above the shoulder portion 55.

Thus, in the operation of the meter, the bearing post 42 and bearing collar 53 form the eccentrically disposed throw arms or journals of the crank assembly, while the single adjusting screw 38 provides a means by which the throws of the journals and the strokes of the cooperative diaphragms may be adjusted simultaneously and to the same extent. This simultaneous adjustment of the diaphragm strokes is indicated diagrammatically in FIG. 2 of the drawing, wherein it will be noted that the bearing post 42 and the bearing collar 53 are movable simultaneously radially inwardly and outwardly of the axis of rotation of the crank plate 28, as defined by the axis of rotation of the drive shaft 23, upon rotation of the adjusting screw 38. The linear paths of adjustment of the bearing post 42 and the bearing collar 53 are disposed in acute angular relation and define an included angle of approximately 80°. Thus, the rotational angle between the bearing post 42 and the bearing collar 53 remains constant regardless of the adjusted position of the post and collar. When it is desired to lengthen the strokes of the diaphragms 11 and 12 to thereby increase the displacement of gas to and from the respective chambers of the meter, the single adjusting screw 38 is simply rotated in a direction to shift the bearing post 42 and bearing collar 53 radially outwardly with respect to the axis of rotation of the crank plate 28, as indicated by broken lines in FIG. 2. Conversely, the strokes of the diaphragms 11 and 12 may be decreased by turning the adjusting screw in the opposite direction.

In view of the foregoing, it will be seen that the present invention provides a mechanically simple, yet highly efficient diaphragm-actuated crank assembly for a three chamber gas meter, and one which provides for the simultaneous and proportional adjustment of the throw arms of the crank assembly through the medium of a single adjusting screw.

While a single preferred embodiment of the invention has been illustrated and described in detail, it will be manifest that various modifications as to details of construction and design may be resorted to without departing from the spirit of the invention or the scope of the following claims.

Having thus described this invention, what is claimed is:

1. In a diaphragm-actuated crank assembly of a gas meter; a crank plate rotatable about a substantially vertical axis; a threaded adjusting screw rotatably carried by said crank plate and disposed in radial, intersecting relation to the axis of rotation of said crank plate; a bearing post slidably carried by said crank plate in eccentric relation to the axis of rotation of said plate and threadedly engaged with said screw, said bearing post being movable radially inwardly and outwardly with respect to axis of rotation of said crank plate upon axial rotation of said screw in opposite directions; a first diaphragm-actuated link pivotally connected with said bearing post; a traveling stud member threadedly carried on said screw in inwardly spaced relation to said bearing post and movable longitudinally of said screw upon axial rotation thereof; an arm slidably carried on said crank plate and having a longitudinal axis disposed in angularly offset relation to the axis of said screw and in radial intersecting relation to the axis of rotation of said crank plate, said arm being formed toward one end thereof with a diagonal slot embracing said stud member, and being movable radially inwardly and outwardly with respect to the axis of rotation of said crank plate and in unison with said bearing post upon axial rotation of said screw; a bearing member rigidly carried by and movable with said arm and disposed in eccentric relation to the axis of rotation of said crank plate and in rotationally spaced relation to said bearing post; and a second diaphragm-actuated link pivotally connected with said bearing member.

2. A diaphragm-actuated crank assembly as defined in claim 1, wherein said crank plate comprises a comparatively flat, triangularly shaped body formed with separate, longitudinally aligned, elongated guide slots in which said bearing post and stud members are respectively movable, said bearing post projecting downwardly below the lower surface of said crank plate and said bearing stud projecting upwardly above the upper surface of said crank plate, and wherein said arm comprises a comparatively thin, flat, metal strip carried on the upper surface of said crank plate for limited radial sliding movement by interfitting pin and slot means, and wherein said bearing member comprises an annular collar rigidly fixed to and projecting upwardly from said strip at the end thereof remote from said diagonal slot.

3. A diaphragm-actuated crank assembly for a three chamber, two diaphragm-type gas meter comprising a substantially longitudinally disposed crank plate rotatable about a substantially vertical axis; and means for pivotally connecting the ends of a pair of reciprocating, diaphragm-actuated pitman links to said crank plate in adjustable-eccentric relation to the axis of rotation of said crank plate, said means comprising a single adjusting screw carried for axial rotation by said crank plate and having its axis of rotation extending radially with respect to the axis of rotation of said crank plate; a first bearing post threadedly carried on said screw and movable radially inwardly and outwardly with respect to the axis of rotation of said crank plate upon axial rotation of said screw in opposite directions, said first bearing post being pivotally connected with one of said pitman links; a cam stud threadedly carried on said screw in longitudinally spaced relation to said first bearing post, said cam stud being movable longitudinally on said screw and radially of the axis of rotation of said crank plate upon axial rotation of said screw; an elongated arm carried on said crank plate for limited linear sliding movement along a line radial to the axis of rotation of said crank plate and in acute angular relation to axis of rotation of said screw, said arm being formed toward one end thereof with a diagonal cam follower slot embracing said cam stud and said arm being movable radially inwardly and outwardly with respect to the axis of rotation of said crank plate upon rotation of said screw in opposite directions; and a second bearing post rigidly carried by said arm at the end thereof remote from said diagonal cam follower slot, said second bearing post being pivotally connected with the other of said pitman links.

No references cited.

RICHARD C. QUEISSER, *Primary Examiner.*